US010075919B2

(12) United States Patent
Alameh et al.

(10) Patent No.: US 10,075,919 B2
(45) Date of Patent: Sep. 11, 2018

(54) PORTABLE ELECTRONIC DEVICE WITH PROXIMITY SENSORS AND IDENTIFICATION BEACON

(71) Applicant: Motorola Mobility LLC, Chicago, IL (US)

(72) Inventors: Rachid M Alameh, Crystal Lake, IL (US); Kevin J McDunn, Lake in the Hills, IL (US); Paul Steuer, Hawthorn Woods, IL (US)

(73) Assignee: Motorola Mobility LLC, Chicago, IL (US)

( * ) Notice: Subject to any disclaimer, the term of this patent is extended or adjusted under 35 U.S.C. 154(b) by 43 days.

(21) Appl. No.: 14/718,569

(22) Filed: May 21, 2015

(65) Prior Publication Data

US 2016/0345264 A1   Nov. 24, 2016

(51) Int. Cl.
*H04W 4/00*   (2018.01)
*H04W 52/02*   (2009.01)
(Continued)

(52) U.S. Cl.
CPC ....... *H04W 52/0229* (2013.01); *H04W 4/023* (2013.01); *H04W 8/005* (2013.01); *H04W 52/0254* (2013.01); *H04M 1/7253* (2013.01); *H04M 2250/12* (2013.01); *Y02D 70/00* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/164* (2018.01); *Y02D 70/26* (2018.01)

(58) Field of Classification Search
CPC ....... H04W 4/02; H04W 4/028; H04W 12/02; H04W 12/00; H04W 12/04
USPC ......... 455/456.1, 411, 452.1, 41.2, 455, 500, 455/41.1, 456.6, 418, 456.3, 434, 419, 455/556.2, 556.1, 558
See application file for complete search history.

(56) References Cited

U.S. PATENT DOCUMENTS

2002/0081972 A1\*   6/2002   Rankin ................. H04W 28/06
455/41.2
2010/0062746 A1\*   3/2010   Proctor, Jr. ......... G06Q 30/0623
455/411

(Continued)

FOREIGN PATENT DOCUMENTS

WO    WO 2014113537 A1 \*   7/2014   ........ H04W 72/0413

*Primary Examiner* — Joseph Arevalo
(74) *Attorney, Agent, or Firm* — Philip H. Burrus, IV

(57) ABSTRACT

An electronic device includes a housing, a user interface, and one or more processors operable with the user interface. At least one proximity sensor component is operable with the one or more processors and can include an infrared signal receiver to receive an infrared emission from an object external to the housing. At least one proximity detector component can be operable with the one or more processors and can include a signal emitter and a corresponding signal receiver. The one or more processors can actuate the at least one proximity detector component when the at least one proximity sensor component receives the infrared emission from the object, thereby causing the signal emitter to transmit a beacon having a unique identifier encoded therein. The beacon allows the device to determine the number and identity of other devices or persons within a thermal detection radius.

20 Claims, 12 Drawing Sheets

(51) Int. Cl.
*H04W 8/00* (2009.01)
*H04W 4/02* (2018.01)
*H04M 1/725* (2006.01)

(56) References Cited

U.S. PATENT DOCUMENTS

| | | | | |
|---|---|---|---|---|
| 2010/0321289 | A1* | 12/2010 | Kim | G06F 1/1626 345/156 |
| 2011/0098029 | A1* | 4/2011 | Rhoads | G01C 21/3629 455/418 |
| 2011/0098056 | A1* | 4/2011 | Rhoads | G01C 21/20 455/456.1 |
| 2012/0071149 | A1* | 3/2012 | Bandyopadhyay | G06F 1/1643 455/418 |
| 2013/0053007 | A1* | 2/2013 | Cosman | G06F 3/017 455/414.3 |
| 2013/0109413 | A1* | 5/2013 | Das | H04W 4/04 455/456.6 |
| 2013/0217332 | A1* | 8/2013 | Altman | H04H 60/90 455/41.2 |
| 2015/0011160 | A1* | 1/2015 | Jurgovan | H04B 5/0031 455/41.1 |
| 2015/0082216 | A1* | 3/2015 | Dai | G06F 3/04886 715/767 |
| 2015/0160819 | A1* | 6/2015 | Hwang | G06F 3/04817 715/769 |
| 2015/0177866 | A1* | 6/2015 | Hwang | G06F 3/042 345/175 |
| 2015/0193040 | A1* | 7/2015 | Hwang | G06F 3/042 345/157 |
| 2015/0234468 | A1* | 8/2015 | Hwang | G06F 3/017 345/156 |
| 2016/0021067 | A1* | 1/2016 | Liu | H04L 63/0428 713/168 |
| 2016/0034058 | A1* | 2/2016 | Stauber | G08C 17/02 345/173 |
| 2016/0094560 | A1* | 3/2016 | Stuntebeck | H04L 63/102 726/1 |
| 2016/0099757 | A1* | 4/2016 | Leabman | H04B 5/0037 307/104 |
| 2016/0142898 | A1* | 5/2016 | Poitau | H04W 72/0413 370/329 |
| 2016/0191121 | A1* | 6/2016 | Bell | H04B 5/0037 307/104 |
| 2016/0210832 | A1* | 7/2016 | Williams | H04W 4/043 |
| 2016/0292978 | A1* | 10/2016 | Lee | H04W 4/06 |

* cited by examiner

PORTABLE ELECTRONIC DEVICE WITH PROXIMITY SENSORS AND IDENTIFICATION BEACON

BACKGROUND

Technical Field

This disclosure relates generally to electronic devices, and more particularly to portable electronic devices having proximity sensors.

Background Art

Proximity sensors detect the presence of nearby objects before those objects contact the device in which the proximity sensors are disposed. Illustrating by example, some proximity sensors emit an electromagnetic or electrostatic field. A receiver then receives reflections of the field from the nearby object. The proximity sensor detects changes in the received field to detect positional changes of nearby objects based upon changes to the electromagnetic or electrostatic field resulting from the object becoming proximately located with a sensor. Electronic devices employ such proximity sensors to manage audio and video device output.

For example, when a device determines that a user's face is proximately located with the device, the device may reduce speaker volume so as not to over stimulate the user's eardrums. As another example, the proximity sensor may turn off the device display when the device is positioned near the user's ear to save power. Thus, these types of wireless communication device dynamically adjust the operation of audio and video output components when these components are positioned very close to, i.e., adjacent to, a user's ear. To work properly, the transmitter emitting the electromagnetic or electrostatic field in these proximity sensors draws power and must be continually operational, which can lead to reduced run time. It would be advantageous to have an improved proximity sensor systems and new uses for the same.

Figure 1:
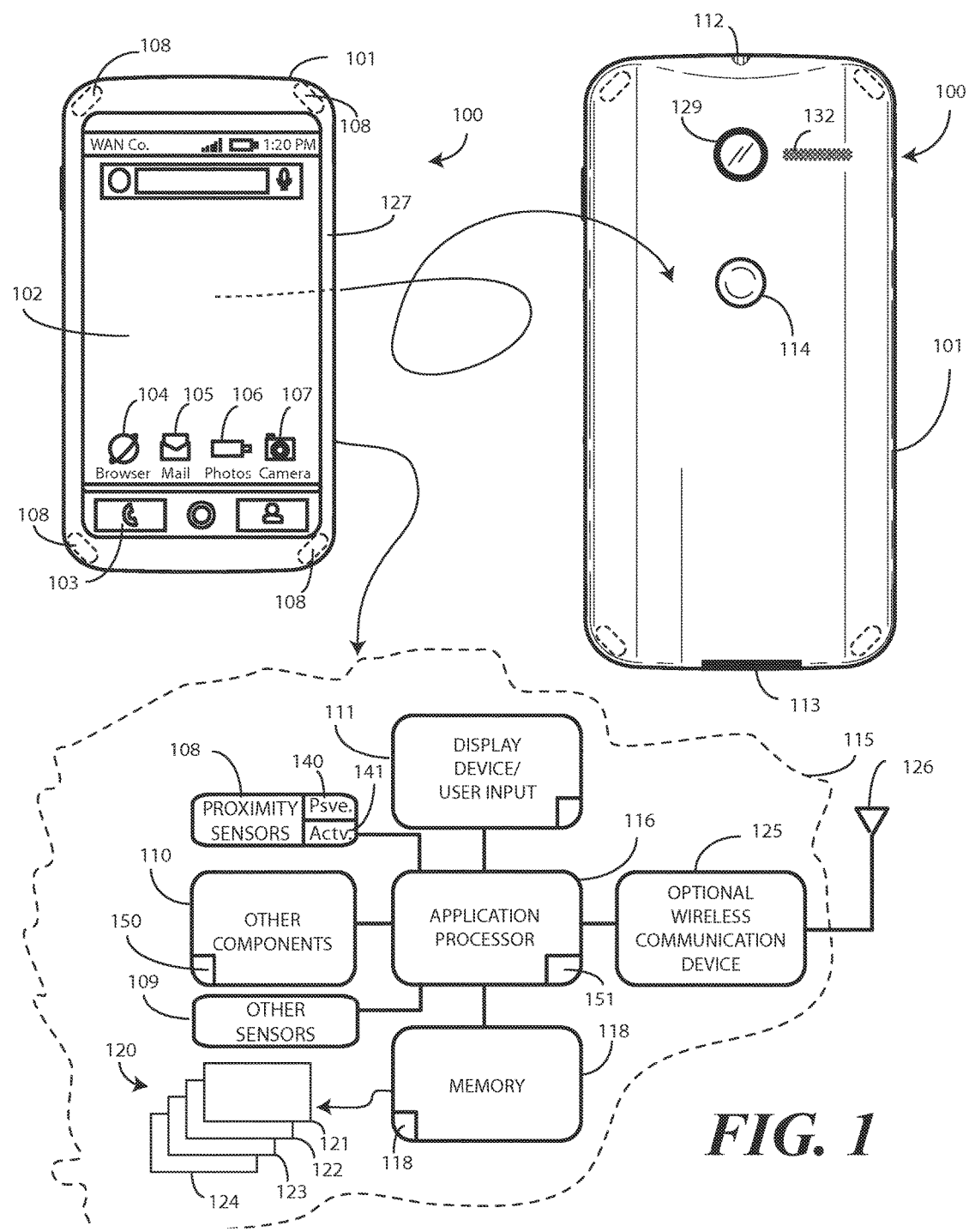
FIG. 1 illustrates one explanatory portable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using proximity sensor components to control modes of operation of an electronic device. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by reducing power consumption, extending run time, and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of controlling proximity sensors and proximity detector components to identify proximately located electronic devices as described herein. The non-processor circuits may include, but are not limited to, a radio receiver, a radio transmitter, signal drivers, clock circuits, power source circuits, and user input devices. As such, these functions may be interpreted as steps of a method to perform device identification in response to one or more proximity sensors components determining that an object is within a thermal detection radius, thus causing a signal emitter of at least one proximity detector component to emit a beacon having a unique identifier encoded therein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes a housing, one or more processors, at least one proximity sensor component operable with the one or more processors, and at least one proximity detector that included a signal emitter and a corresponding signal receiver. The proximity sensor components include an infrared signal receiver to receive an infrared emission from an object external to the housing.

In one embodiment, the one or more proximity sensor components detect one or more people within a thermal detection radius by receiving infrared emissions from the people. When this occurs, in one embodiment the proximity sensor components and/or the one or more processors trigger the proximity detector components, which are generally used for gesture control and other user interface protocols. However, when triggered, in one embodiment the signal emitters of the proximity detector components transmit a beacon having a unique identifier encoded therein. In one or more embodiments, each beacon is specific to a device, as indicated by the unique identifier. The unique identifier may be a pseudo-random number with the device International Mobile Station Equipment Identity (IMEI) number used as a seed for the pseudorandom number. Other examples of unique identifiers will be obvious to those of ordinary skill in the art having the benefit of this disclosure.

In one embodiment, the proximity detector components multiplex the beacon with one or more proximity detection beams that are used for gesture detection and other user interface protocols. For example, the signal emitters of a proximity detector component may transmit the beacon serially with the proximity detection beams in specific time slots. Advantageously, this allows the beacon to be transmitted without interrupting the gesture detection system. In one or more embodiments, the transmitted beacon can reflect from the ceiling, floor, or other surfaces as it travels to signal receivers of other electronic devices.

In one embodiment, when the one or more proximity sensor components detect one or more people within a thermal detection radius, the proximity sensor components and/or the one or more processors also trigger and/or enable the corresponding signal receivers of the proximity detector components. The one or more processors can monitor the corresponding signal receiver for a response transmission from another electronic device in response to transmission of the beacon. Where other devices are similarly configured, they can transmit a response transmission having another unique identifier encoded therein. The one or more processors of the beacon-transmitting device can receive, with a corresponding signal receiver of a proximity detector component, and in response to transmission of the beacon, the response transmission. The one or more processors can then identify the other electronic device from the received unique identifier. The number of response signals thus indicates the number and identity of devices within the thermal detection radius. Other sensors can be used to supplement this identification protocol if needed, such as identification protocols from an imager, a Global Positioning Device (GPS) when the device is outdoors, and so forth.

Embodiments of the disclosure provide an electronic device, which may be portable in one or more embodiments, having a housing. The housing can include a front major face, a rear major face, a first side edge, and a second side edge. In one embodiment, a display or other user interface component is disposed along the front major face. One or more processors can be operable with the display or user interface.

In one embodiment, the electronic device has at least one proximity sensor component that is operable with the one or more processors. In one embodiment, the at least one proximity sensor component comprises a receiver only, and does not include a corresponding transmitter. In one or more embodiments, the electronic device also includes one or more proximity detector components comprising transmitter-receiver pairs. However, as used herein, a "proximity sensor component" comprises a receiver only that does not include a corresponding transmitter.

Illustrating by example, in one embodiment the proximity sensor component comprises a signal receiver to receive signals from objects external to the housing of the electronic device. In one embodiment, the signal receiver is an infrared signal receiver to receive an infrared emission corresponding to thermal emissions or heat emissions from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being. Additionally, detection of wavelengths in this range is possible from farther distances than, for example, would be the detection of reflected signals from the transmitter of a proximity detector component.

Accordingly, the one or more processors may be in a low power or sleep mode when no user is near the electronic device. During this time, the at least one proximity sensor component, which consumes very little power in one or more embodiments, can be active. When a user comes within reception range of the at least one proximity sensor component, infrared emissions from the user are detected by the at least one proximity sensor component.

When detecting a person is within a thermal reception radius, in one embodiment the one or more processors and/or the one or more proximity sensor components can actuate at least one proximity detector component operable with the one or more processors and comprising a signal emitter and a corresponding signal receiver. When the at least one proximity sensor component receives the infrared emission from the object, the signal emitter is actuated, thereby causing the signal emitter to transmit a beacon having a unique identifier encoded therein.

After transmitting the beacon, in one embodiment the one or more processors are to receive, with the corresponding signal receiver, a response transmission from another electronic device having another unique identifier encoded therein. The one or more processors can identify the other electronic device from the other unique identifier. In one or more embodiments, the one or more processors can present indicia on the user interface, such as a message or alert, comprising an identification of the other electronic device.

Upon failing to identify the other electronic device from the other unique identifier, in one embodiment the one or more processors can cause the signal emitter to transmit a request signal requesting identification credentials from the other electronic device. In one embodiment, in response to transmitting the request signal, the one or more processors can receive through the signal emitters of the proximity detector components another response transmission from the other electronic device having at least some of the identification credentials encoded therein. This advantageously allows the one or more processors to identify previously unidentifiable electronic devices.

In one embodiment, the one or more processors can monitor the corresponding signal receiver for a response transmission from another electronic device in response to transmission of the beacon. Upon failing to receive the response transmission, in one embodiment the one or more processors can cause the signal emitter to transmit a request signal requesting identification credentials from the other electronic device.

The one or more processors can also actuate one or more user interface devices when the infrared signal receiver receives the infrared emission from the user to "wake" the device. Accordingly, the device will be ready to use once a user reaches the device without requiring additional user operations to bring the device out of the low power or sleep mode. Other actions or control operations in response to detecting the presence of a user, receiving a response signal, or transmitting a beacon will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes two housing members. A front housing member 127 is disposed about the periphery of the display 102 in one embodiment. A rear-housing member 128 forms the backside of the electronic device 100 in this illustrative embodiment and defines a rear major face of the electronic device. Features can be incorporated into the housing members 127,128. Examples of such features include an optional camera 129 or an optional speaker port 132, which are show disposed on the rear major face of the electronic device 100 in this embodiment. In this illustrative embodiment, a user interface component 114, which may be a button or touch sensitive surface, can also be disposed along the rear-housing member 128.

In one embodiment, the electronic device 100 includes one or more connectors 112,113, which can include an analog connector, a digital connector, or combinations thereof. In this illustrative embodiment, connector 112 is an analog connector disposed on a first edge, i.e., the top edge, of the electronic device 100, while connector 113 is a digital connector disposed on a second edge opposite the first edge, which is the bottom edge in this embodiment.

A block diagram schematic 115 of the electronic device 100 is also shown in FIG. 1. In one embodiment, the electronic device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE)

networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable with one or more user interface devices 111, which can include the display 102, to present presentation information to a user. The executable software code used by the one or more processors 116 can be configured as one or more modules 120 that are operable with the one or more processors 116. Such modules 120 can store instructions, control algorithms, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a photo application 106 configured to permit the user to view images or video on the display 102 of electronic device 100, and a camera application 107 configured to capture still (and optionally video) images. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one embodiment, one or more proximity sensors 108 can be operable with the one or more processors 116. In one embodiment, the one or more proximity sensors 108 include one or more proximity sensor components 140. The proximity sensors 108 can also include one or more proximity detector components 141. In one embodiment, the proximity sensor components 140 comprise only signal receivers. By contrast, the proximity detector components 141 include a signal receiver and a corresponding signal transmitter.

While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments the proximity sensor components have a longer detection range than do the proximity detector components due to the fact that the proximity sensor components detect heat emanating from a person's body while the proximity detector components rely upon reflections of infrared light emitted from the signal transmitter. For example, the proximity sensor component may be able to detect a person's body heat from a distance of about ten feet, while the signal receiver of the proximity detector component may only be able to detect reflected signals from the transmitter at a distance of about one to two feet.

In one embodiment, the proximity sensor component 140 comprises an infrared signal receiver so as to be able to detect infrared emissions from a person. Accordingly, the proximity sensor component 140 requires no transmitter since objects disposed external to the housing deliver emissions that are received by the infrared receiver. As no transmitter is required, each proximity sensor component 140 can operate at a very low power level. Simulations show that a group of infrared signal receivers can operate with a total current drain of just a few microamps. By contrast, a proximity detector component 141, which includes a signal transmitter, may draw hundreds of microamps to a few milliamps.

Figure 2:
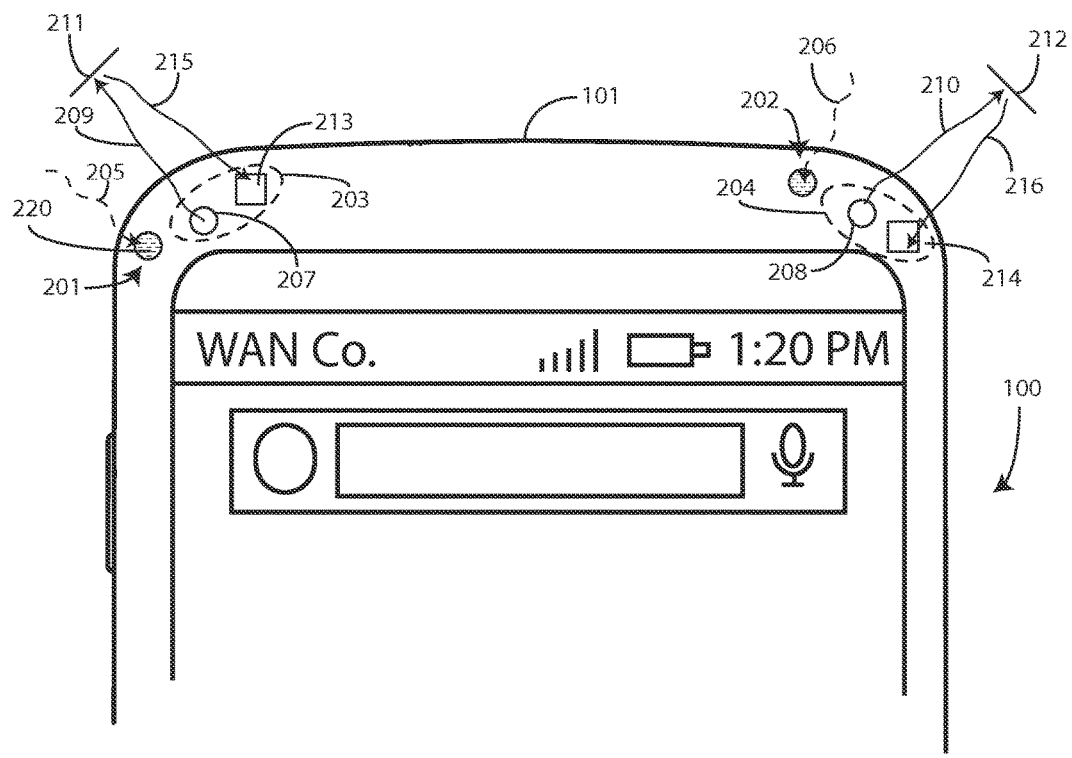
FIG. 2 illustrates explanatory proximity sensor component and proximity detector component configurations in accordance with one or more embodiments of the disclosure.

Turning briefly to FIG. 2, illustrated therein are two proximity sensor components 201,202 and two proximity detector components 204, each disposed at a corner of the electronic device 100. In this embodiment, each proximity sensor component 201,202 comprises a signal receiver 220, such as an infrared photodiode to detect an infrared emission 205,206 from an object external to the housing 101 of the electronic device 100. No corresponding transmitter is included or required for the proximity sensor component 201,202 to function. As no active transmitter emitting signals is included, each proximity sensor component 201,202 is sometimes referred to as a "passive IR" proximity sensor.

By contrast, each proximity detector component 203,204 can be an infrared proximity sensor set that uses a signal emitter 207,208 that transmits a beam 209,210 of infrared light that reflects 211,212 from a nearby object and is received by a corresponding signal receiver 213,214. Proximity detector components 203,204 can be used, for example, to compute the distance to any nearby object from characteristics associated with the reflected signals 215,216. The reflected signals 215,216 are detected by the corresponding signal receiver 213,214, which may be an infrared photodiode used to detect reflected light emitting diode (LED) light, respond to modulated infrared signals, and/or perform triangulation of received infrared signals.

Figure 3:
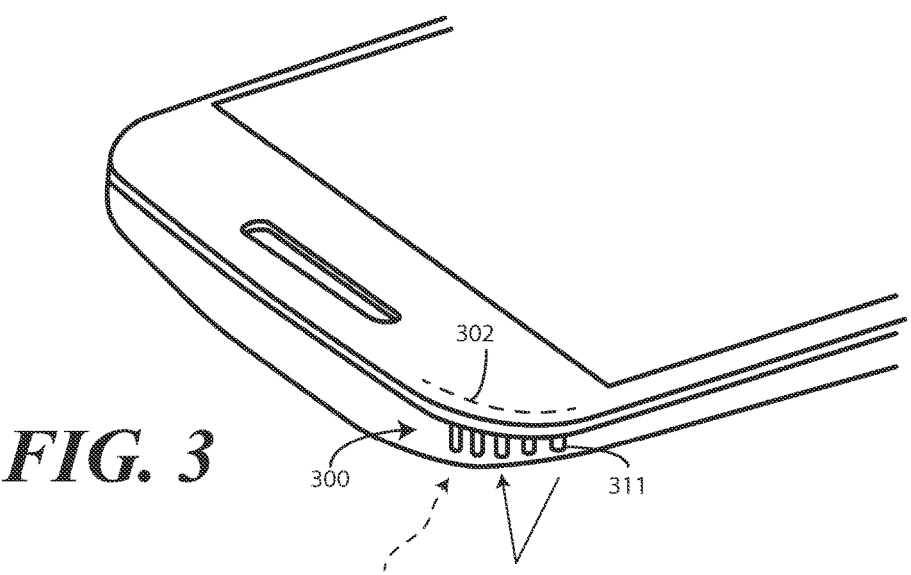
FIG. 3 illustrates one explanatory proximity sensor component and proximity detector component configuration in accordance with one or more embodiment of the disclosure.

In one embodiment, the proximity sensor components 201,202 and the proximity detector components 203,204 can include at least two sets of components. For example, a first set of components can be disposed at a first corner of the electronic device 100, while another set of components can be disposed at a second corner of the electronic device 100. As shown in FIG. 3, when the components are disposed at a corner 300 of the electronic device, the components can be disposed behind a grille 301 that defines one or more apertures through which infrared emissions are received and optionally transmitted.

In one embodiment, the grille 301 can define one or more reception beams in which infrared emissions can be received. The definition of such reception beams can enable the proximity sensor components (201,202) to detect motion by determining along which reception beams each emission is received. The proximity sensor components (201,202) can also detect changes across reception beams to detect motion as well.

The use of the grille 301 can also allow components to be collocated as well. For example, in one embodiment both a proximity sensor component (201) and a proximity detector component (203) can be disposed behind a common grille 301, with the one or more apertures being used to steer various reception and/or transmission beams. In one embodiment, each grille 301 can be associated with a lens 302 disposed behind the grille 301 to assist with the definition of the reception and/or transmission beams. For example, a polycarbonate lens 302 can be disposed behind the grille 301 and configured as a compound Fresnel lens with a predetermined number of slits, such as five or seven, to assist with the definition of the reception and/or transmission beams.

Figure 4:
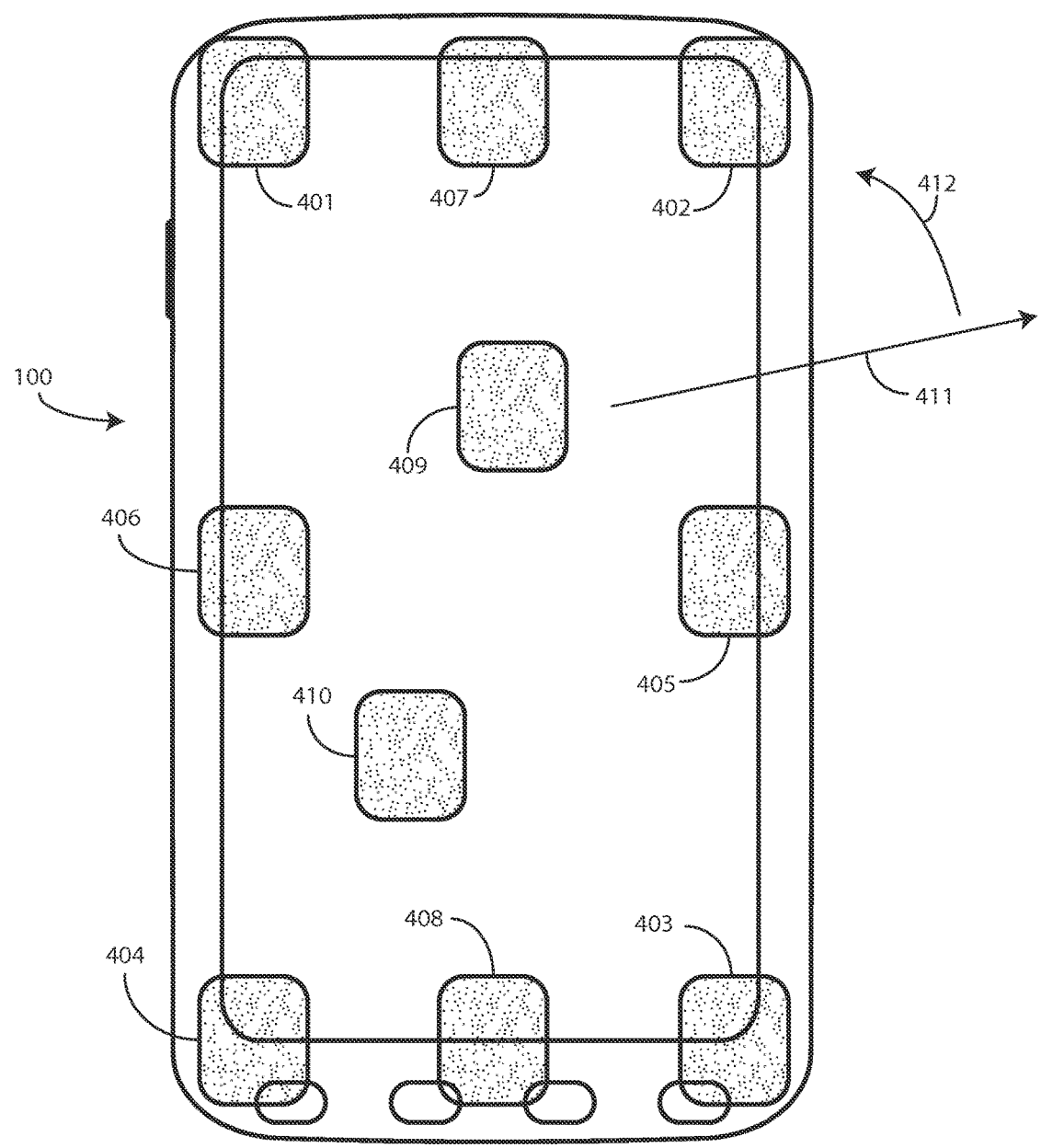
FIG. 4 illustrates explanatory locations along an electronic device where one or more proximity sensor components or proximity detector components can be disposed in accordance with one or more embodiments of the disclosure.

It should be noted that corners 300 are not the only location at which proximity sensor and detector components can be located. Turning now to FIG. 4, illustrated therein are some of the many locations at which proximity sensor components, and optionally proximity detector components, may be located. These locations include corner locations 401,402,403,404, edge locations 405,406, end locations 407,408, major face locations 409, or ad hoc locations 410 based upon location. These locations can be used individually or in combination to achieve the desired detection radius 411 and radial detection sweep 412 about the electronic device 100. For example, some components can be disposed along the front major face of the electronic device 100, while other components are disposed on the rear major face of the electronic device 100, and so forth. Other locations and combinations will be obvious to those of ordinary skill in the art having the benefit of this disclosure.

Turning now back to FIG. 1, in one embodiment, the one or more processors 116 may generate commands based on information received from one or more proximity sensors 108. The one or more processors 116 may generate commands based upon information received from a combination of the one or more proximity sensors 108 and one or more other sensors 109. The one or more processors 116 may process the received information alone or in combination with other data, such as the information stored in the memory 118.

The one or more other sensors 109 may include a microphone, and a mechanical input component such as button or key selection sensors, touch pad sensor, touch screen sensor, capacitive sensor, and switch. Touch sensors may used to indicate whether the device is being touched at side edges, thus indicating whether or not certain orientations or movements are intentional by the user. The other sensors 109 can also include surface/housing capacitive sensors, audio sensors, and video sensors (such as a camera).

The other sensors 109 can also include motion detectors, such as accelerometers or gyroscopes. For example, an accelerometer may be embedded in the electronic circuitry of the electronic device 100 to show vertical orientation, constant tilt and/or whether the device is stationary. The measurement of tilt relative to gravity is referred to as "static acceleration," while the measurement of motion and/or vibration is referred to as "dynamic acceleration."

In one embodiment, the other sensors 109 can further include an intelligent imager 150 that is configured to capture an image of an object and determine whether the object matches a predetermined criterion. For example, the intelligent imager 150 can be operable with an identification module 151 configured with optical recognition such as include image recognition, character recognition, visual recognition, facial recognition, color recognition, shape recognition and the like. Advantageously, the identification module 151 can be used with the intelligent imager 150 as a facial recognition device to determine the identity of one or more persons detected about the electronic device 100. For example, in one embodiment when the one or more proximity sensor components 140 detect a person, the intelligent imager can capture a photograph of that person. The identification module 151 can then compare the image to a reference file stored in memory 118, to confirm beyond a threshold authenticity probability that the person's face sufficiently matches the reference file. Beneficially, optical recognition allows the one or more processors to enter the normal mode of operation only when one of the persons detected about the electronic device 100 are sufficiently identified as the owner of the electronic device.

In other embodiments, the identification module 151 can be operable with an audio input, such as a microphone included with the other sensors 109. Accordingly, the identification module 151 can sample sounds when the one or more proximity sensor components 140 detect a person within a reception radius. The identification module 151 can then compare the sampled audio file to a reference file stored in memory 118, to confirm beyond a threshold authenticity probability that the person's voice profile sufficiently matches the reference file. Accordingly, in one or more embodiments the memory 118 can hold identification information that allows the identification module 151 to identify an owner of the electronic device 100 by comparing the captured audio information with the reference identification information in a voice identification process. While facial recognition and audio recognition are two possible ways of identifying a user in accordance with one or more embodiments, other identification techniques will be obvious to those of ordinary skill in the art having the benefit of this disclosure.

Other components 110 operable with the one or more processors 116 can include output components such as video, audio, and/or mechanical outputs. For example, the output components may include a video output component such as the display 102 or auxiliary devices including a cathode ray tube, liquid crystal display, plasma display, incandescent light, fluorescent light, front or rear projection display, and light emitting diode indicator. Other examples of output components include audio output components such as speaker port 132 or other alarms and/or buzzers and/or a mechanical output component such as vibrating or motion-based mechanisms.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 5:
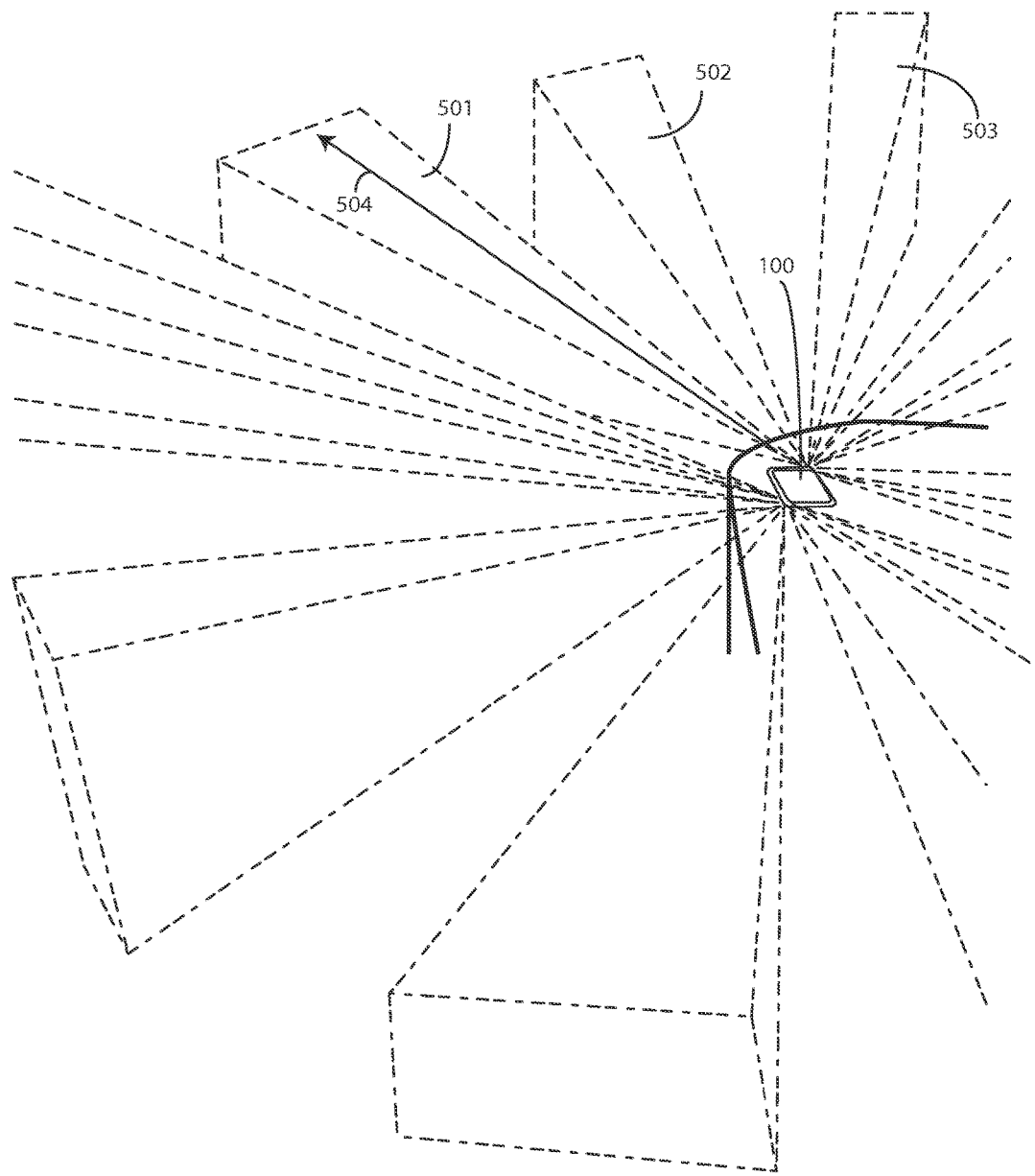
FIG. 5 illustrates an explanatory device having one or more proximity sensor components comprising infrared signal receivers, as well as one or more proximity detector components comprising signal emitters and corresponding signal receivers, in accordance with one or more embodiments of the disclosure.

Turning now to FIG. 5, the electronic device 100 is in a first mode of operation. Most components, including the display (102) and other sensors (109) and components (110) are in a low power or sleep mode. However, the one or more proximity sensor components 140 are in their active mode waiting to receive infrared emissions from an object external to the housing (101) of the electronic device 100. As shown in FIG. 5, one or more signal reception beams 501,502,503 can be defined within which infrared emissions are received as previously described above with reference to FIG. 3. In this embodiment, the signal reception beams 501,502,503 define a 360-degree reception area about the device with a thermal reception radius 504 of about ten feet. As no user is within the thermal reception radius 504, power consumption within the electronic device 100 can remain extremely low.

Figure 6:
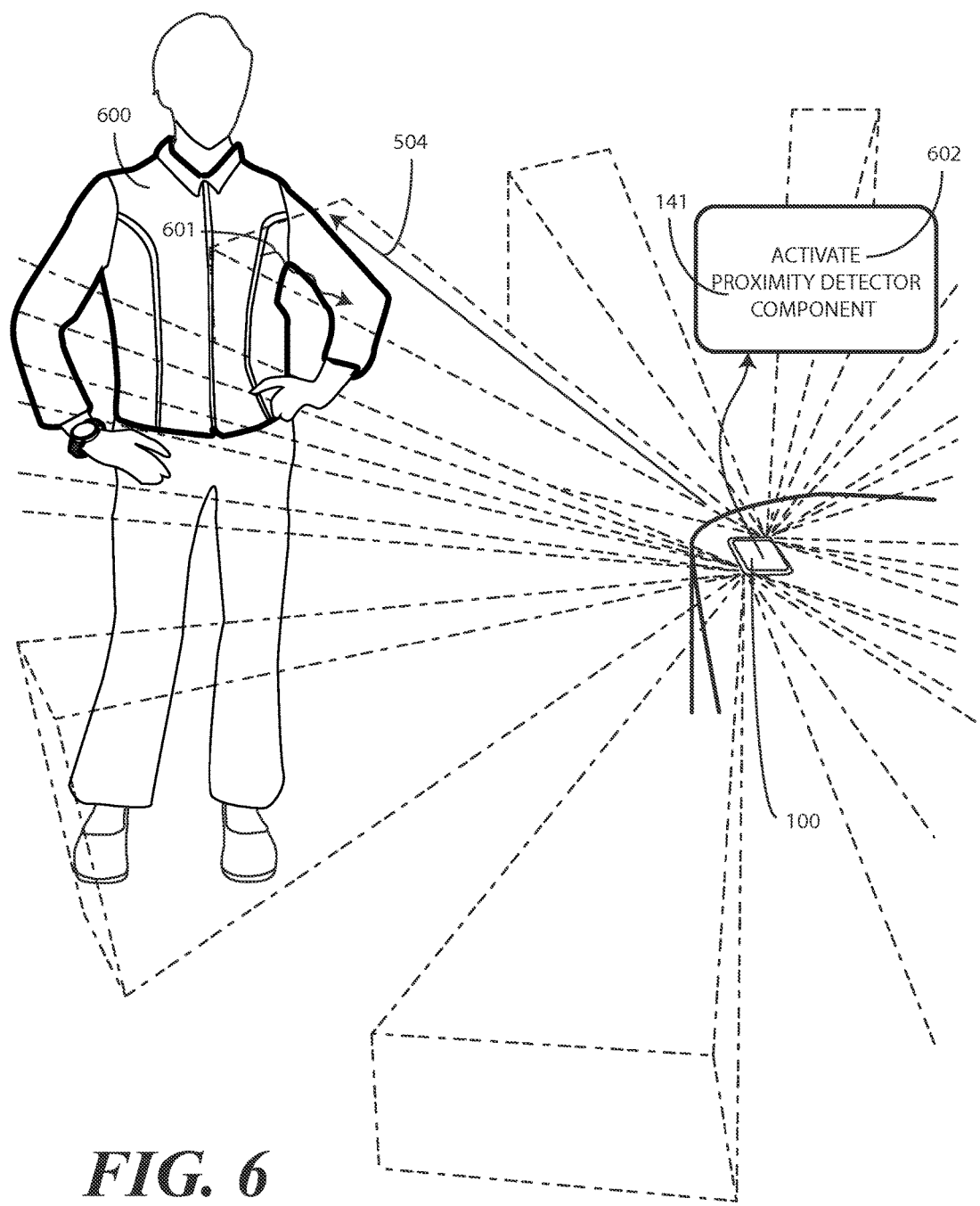
FIG. 6 illustrates the explanatory device of FIG. 5 receiving an infrared emission from an object external to the housing and executing one or more method steps, each in accordance with one or more embodiments of the disclosure.

Turning now to FIG. 6, a user 600 enters the thermal reception radius 504. The user's body heat results in an infrared emission 601 being delivered to the one or more proximity sensor components (140) of the electronic device 100. When this occurs, the proximity sensor components (140) and/or more processors (116) the operable to actuate 602 the at least one proximity detector component 141.

Figure 7:
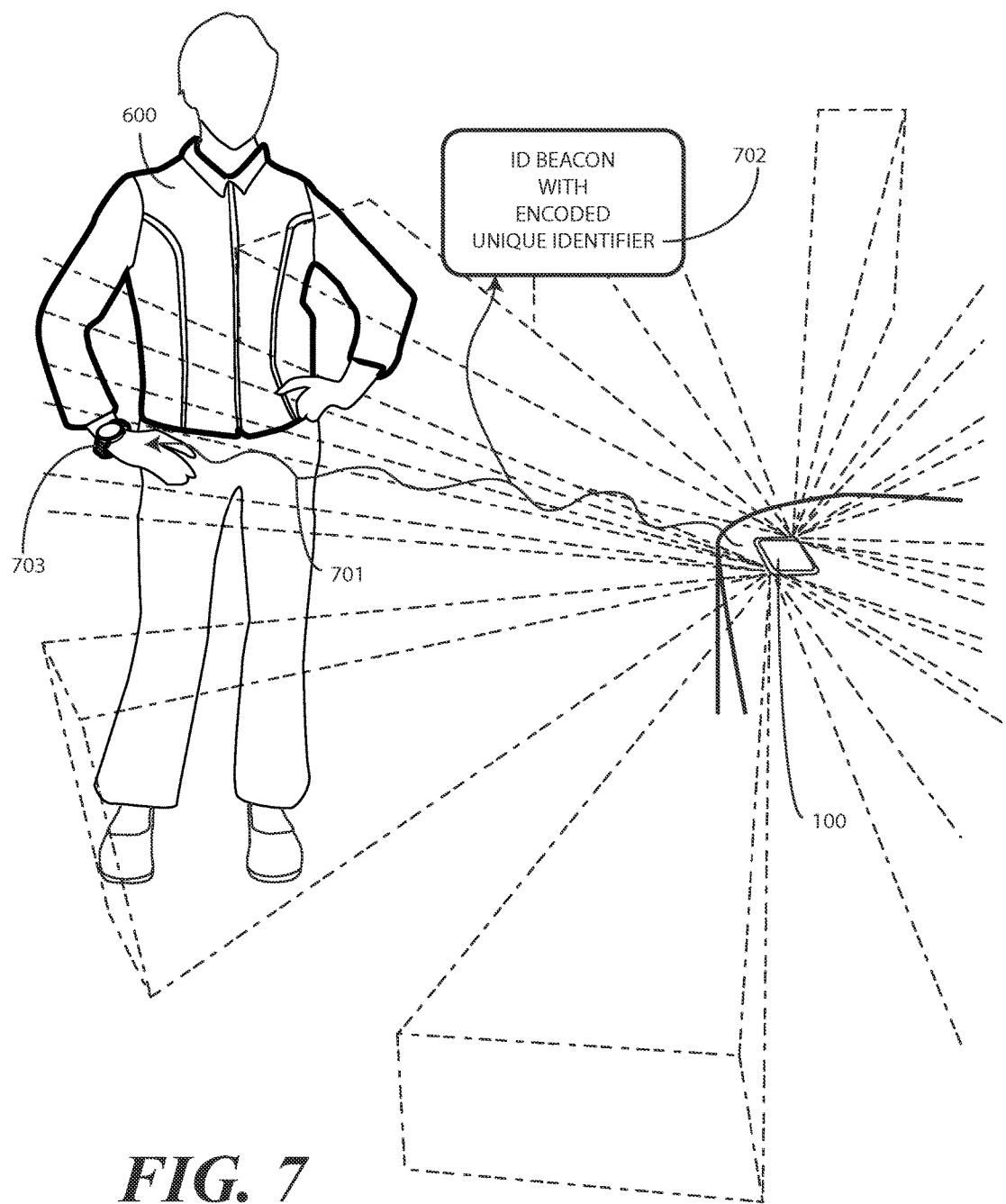
FIG. 7 illustrates one or more method steps in accordance with one or more embodiments of the disclosure.

As shown in FIG. 7, this causes the signal emitter (207) of the proximity detector component (141) to transmit a beacon 701 having a unique identifier 702 encoded therein. It should be noted that while the proximity sensor components (140) can actuate the proximity detector component 141, other devices can optionally trigger the proximity detector component 141 as well. For example, if the electronic device 100 is in a user's hand, an accelerometer or other motion detector can equally trigger the proximity detector component 141, thereby causing it to transmit the beacon 701. Other mechanisms for causing the proximity detector component 141 to transmit the beacon 701 will be obvious to those of ordinary skill in the art having the benefit of this disclosure.

In one embodiment, the unique identifier 702 is unique to the electronic device 100, in that no other electronic device has the same unique identifier 702. The unique identifier 702 can take any of a variety of forms. For example, in one embodiment the unique identifier 702 comprises a pseudo-random code. In another embodiment, the unique identifier 702 comprises an IMEI number. In still another embodiment, the unique identifier 702 comprises a pseudo-random number using the device IMEI number as a seed for the pseudo-random number generation. Other examples of possible unique identifiers will be obvious to those of ordinary skill in the art having the benefit of this disclosure.

In this illustrative embodiment, the user 600 is wearing a companion electronic device 703, which is configured as a smart watch that has been paired with the electronic device 100. In this embodiment, the companion electronic device 703 is also equipped with at least one proximity detector component operable with the one or more processors and comprising a signal emitter and a corresponding signal receiver. The signal receiver of the companion electronic device 703 receives the beacon 701 and identifies the electronic device 100 from the unique identifier 702.

Figure 8:
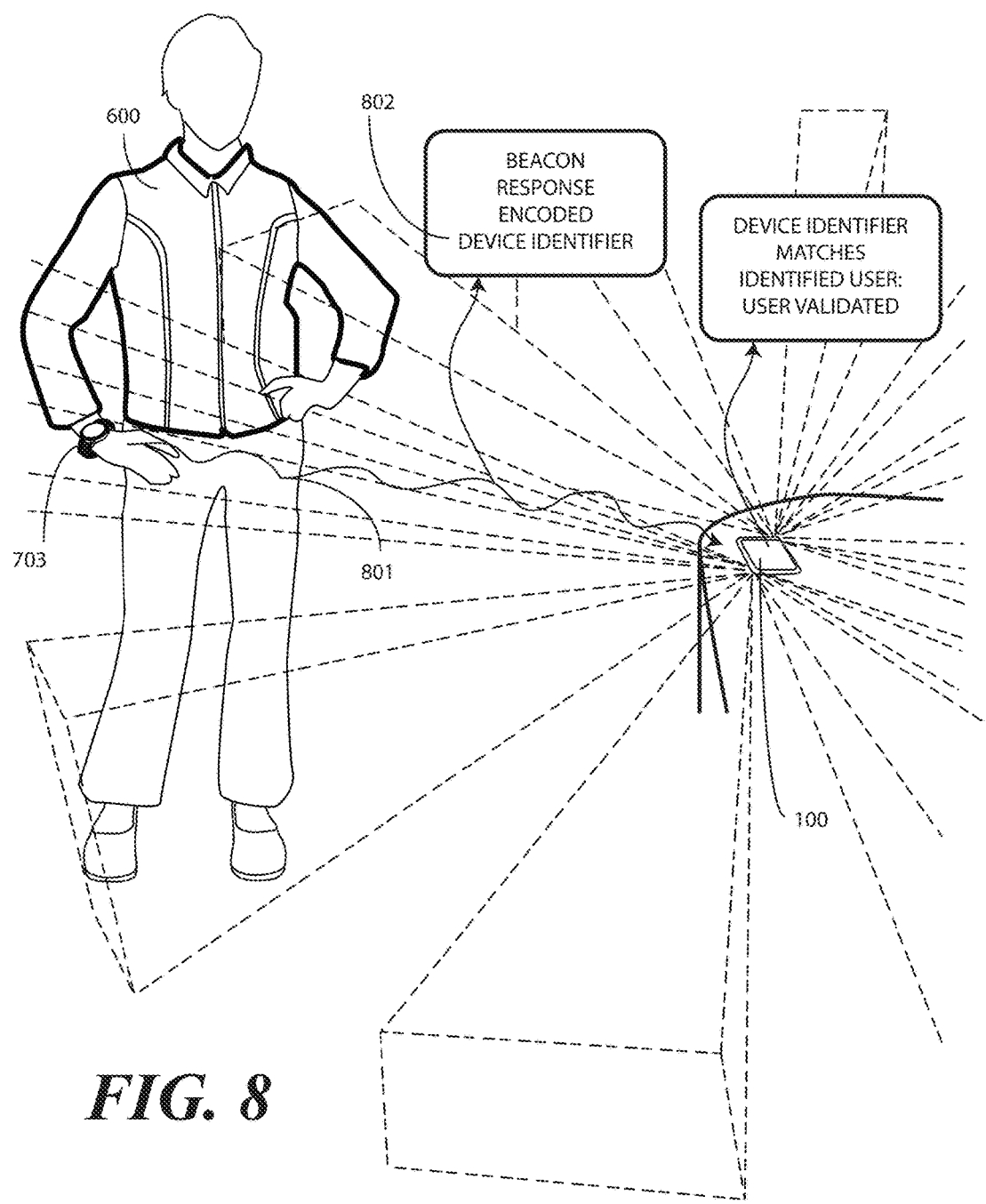
FIG. 8 illustrates one or more method steps in accordance with one or more embodiments of the disclosure.

In response, turning now to FIG. 8, the signal emitter of the companion electronic device 703 transmits a response transmission 801 having another unique identifier 802 encoded therein. The corresponding signal receiver (213) of the electronic device 100 receives the response transmission 801 having the other unique identifier 802 encoded therein. When this occurs, the one or more processors (116) can identify the other electronic device from the other unique identifier to validate the user 600. Accordingly, using the beacon (701) and response transmission 801, the electronic device can determine the identity of the user 600 to validate that the user 600 is eligible to use the electronic device 100.

It should be noted that, in one or more embodiments, the one or more processors (116) can optionally attempt to identify the user 600 in other ways as well. Recall from above that in one embodiment the electronic device 100 can include an intelligent imager (150) configured to capture an image of an object and determine whether the object matches predetermined criteria. The intelligent imager can include an identification module (151) having optical recognition such as include image recognition, character recognition, visual recognition, facial recognition, color recognition, shape recognition and the like. Alternatively, the electronic device can have an identification module (151) operable with an audio input, such as a microphone included with the other sensors 109. Where this is the case, the one or more processors (116) can optionally attempt to identify the user 600 using one of these techniques in addition to using the other identifier 802 from the companion electronic device 703.

Figure 9:
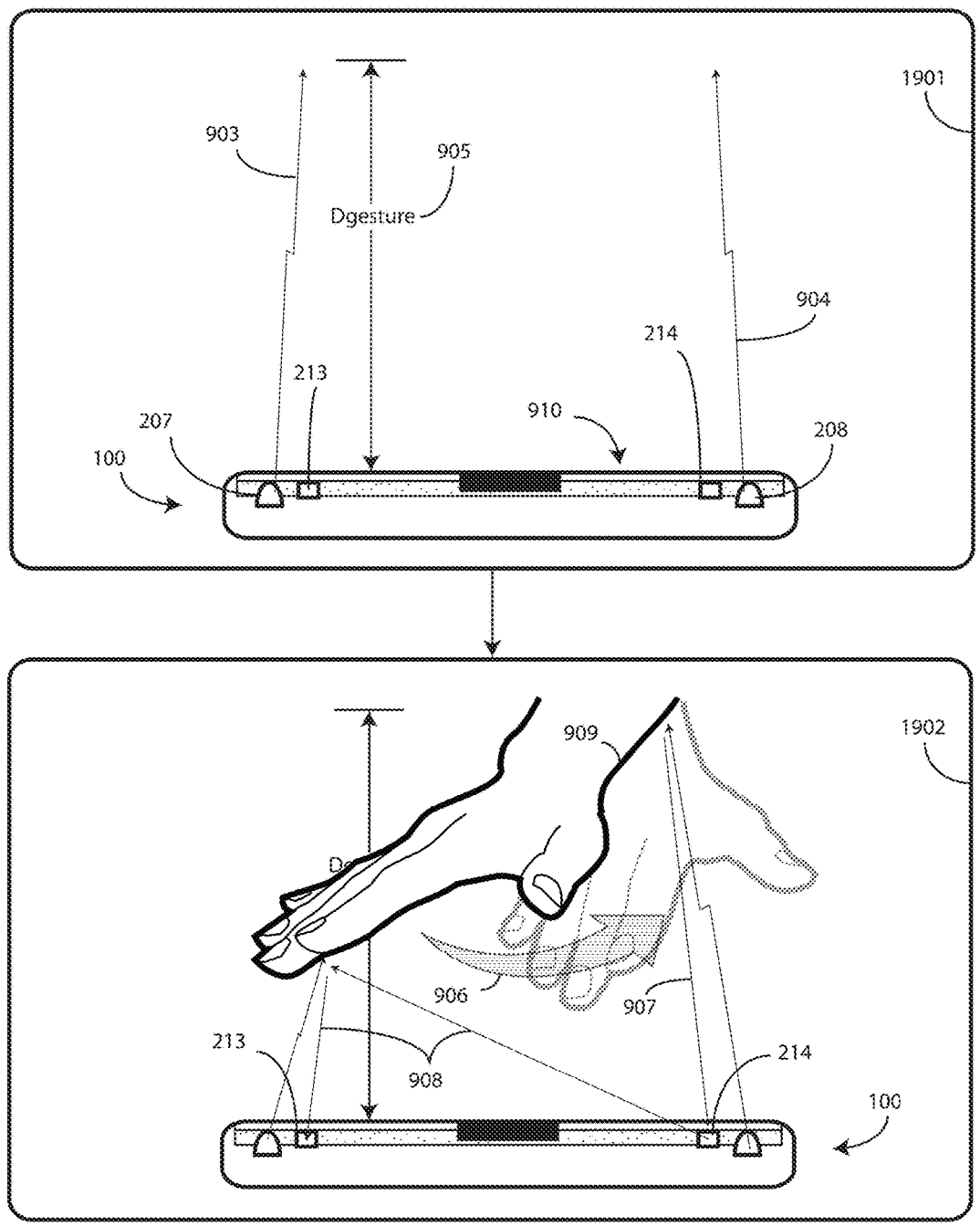
FIG. 9 illustrates one or more method steps in accordance with one or more embodiments of the disclosure.
Figure 10:
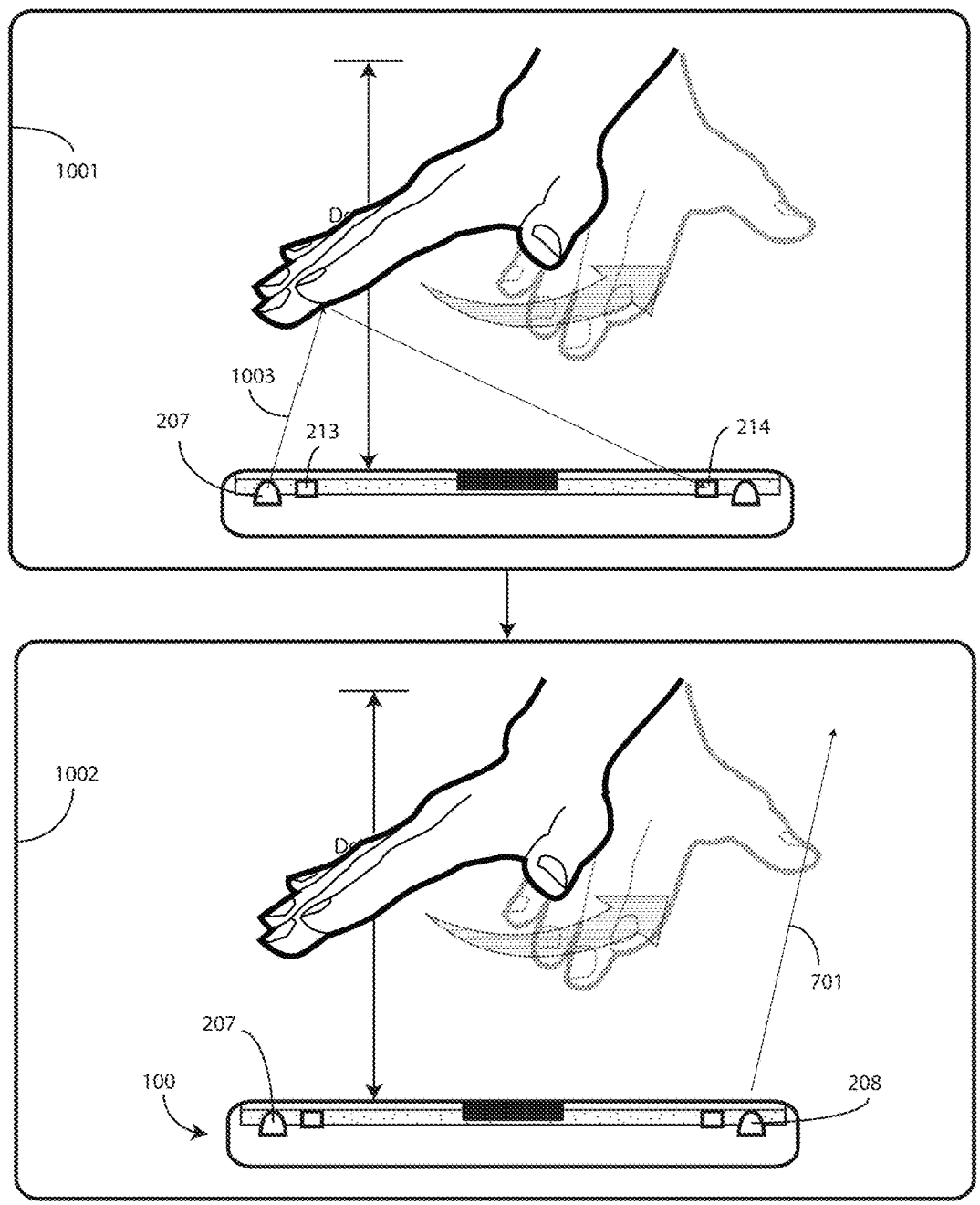
FIG. 10 illustrates one or more method steps in accordance with one or more embodiments of the disclosure.

As noted above, in one or more embodiments the proximity detector components (141) of the electronic device 100 are used for gesture detection in addition for transmitting the beacon. One example of how this works is shown in FIGS. 9 and 10. Beginning with FIG. 9, this electronic device 100 includes four proximity detector components (141), with one proximity component disposed at each corner of the electronic device 100. Accordingly, the electronic device 100 has four signal emitters and four corresponding signal receivers, with two being shown in this end view. Specifically, illustrated in FIG. 9 are signal emitter 207 and signal emitter 208, as well as signal receiver 213 and signal receiver 214. Also shown are corresponding signal receiver 213 and corresponding signal receiver 214. The other signal emitters and corresponding signal receivers are disposed at the distal end of the electronic device 100, which is into the page as viewed in FIG. 9.

The signal receivers 213,214 and corresponding signal receivers 213,214 can be used for gesture detection and other user input protocols. As shown in FIG. 9 at step 1901, signal emitter 207 and signal emitter 208 emit signals 903, 904 to reflect from objects a distance 905 from at least one major face 910 of the electronic device 100 to the two corresponding signal receivers 213,214 to detect gesture input. Accordingly, as shown at step 1902, the one or more processors (116) of the portable electronic device 100 can detect gesture input 906 by receiving electronic signals from corresponding signal receiver 213 and corresponding signal receiver 214 corresponding to received, reflected signals 907,908 from the user's hand 909.

So as not to interfere with this gesture detection, in one embodiment the signal emitters 207,208 can emit the beacon (701) serially with one or more proximity detection beams and within in specific time slots. Advantageously, this allows the beacon (701) to be transmitted without interrupting the gesture detection system. One example of how this can be accomplished is shown in FIG. 10.

Turning now to FIG. 10, at step 1001 signal emitter 207 is emitting a proximity detection signal 1003 that is reflected back to corresponding signal receiver 213 and or signal receiver 214. After this occurs, as shown at step 1002, signal emitter 208 can emit the beacon 701. In one or more embodiments, this multiplexed signal emission occurs when the one or more processors (116) of the electronic device 100 cause the signal emitters 207,208 to transmit the beacon 701 in accordance with a time division-multiplexing algorithm along with the one or more proximity detection beams 1003.

In one or more embodiments, the electronic device of another user may not be identifiable. A particular electronic device may not know the unique identifier of the electronic device, or another electronic device may not be configured to reply to a beacon with a response transmission. In such embodiments, the one or more processors (116) of an electronic device (100) can be configured to cause the signal emitters (207,208) of the proximity detector components (141) to transmit a request signal requesting identification credentials from the other electronic device. This can occur upon failing to identify another electronic device from its unique identifier, in response to the one or more processors (116) monitoring the corresponding signal receiver (213, 214) for a response transmission from another electronic device and failing to receive the response transmission, or for other reasons. Illustrative examples are shown in FIGS. 11 and 12.

Figure 11:
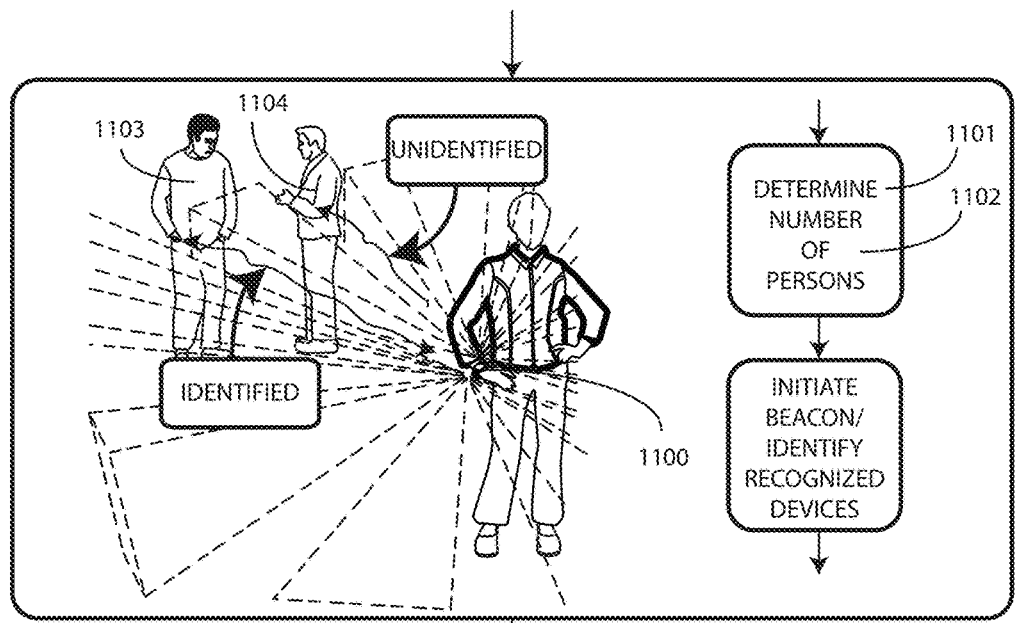
FIG. 11 illustrates one or more method steps in accordance with one or more embodiments of the disclosure.

Beginning with FIG. 11, an electronic device 1100 of a user 600 receives infrared emissions when people are within the thermal detection radius of the electronic device 1100. Accordingly, the electronic device 1100 is able to determine 1101 how many people 1102 are within the thermal reception radius. As previously described, in one embodiment the electronic device 1100 then actuates at least one proximity detector component when at least one proximity sensor component receives the infrared emission from the people, thereby causing the signal emitter to transmit a beacon having a unique identifier encoded therein. The electronic device 1100 then receives, with a corresponding signal receiver, and in response to transmission of the beacon, a response transmission from another electronic device having another unique identifier encoded therein. The electronic device 1100 can then identify the other electronic device from the other unique identifier. Here, user 1103 has been so identified.

However, user 1104 has not been identified. This can be due to the fact that user 1104 has an electronic device that electronic device 1100 fails to identify, that user 1104 has an electronic device that fails to send a response transmission, or for other reasons. In one embodiment, when either occurs, the electronic device 1100 cause the signal emitter to transmit a request signal requesting identification credentials from the other electronic device. This is shown in FIG. 12.

Figure 12:
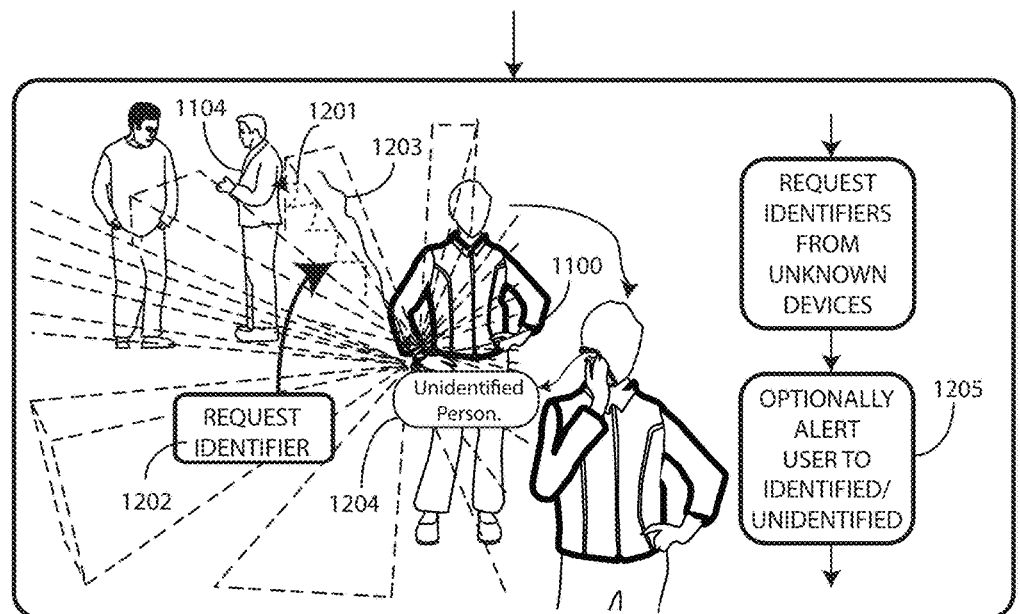
FIG. 12 illustrates one or more method steps in accordance with one or more embodiments of the disclosure.

Turning to FIG. 12, the electronic device 1100 transmits a request signal 1201 requesting identification credentials 1202 from the unknown device. In one embodiment, the electronic device 1100 then receives another response transmission 1203 from the other electronic device, i.e., the unknown device belonging to user 1104. In one embodiment, the response transmission 1203 has at least some of the identification credentials encoded therein, thereby allowing the electronic device 1100 to identify user 1104.

In one or more embodiments, the one or more processors of the electronic device 1100 can present indicia 1204 on a user interface, such as a display, comprising an identification of the other user 1104 or the other electronic device. For example, the one or more processors might present a message on the display stating, "two other people in the room," or "one identified person and one unidentified person in the room," or "Bob and Sally and an unknown guest have just arrived." These notifications are explanatory only, as others will be obvious to those of ordinary skill in the art having the benefit of this disclosure. As shown at step 1205, in one embodiment this can occur regardless of whether the electronic devices and/or users are identified.

Figure 13:
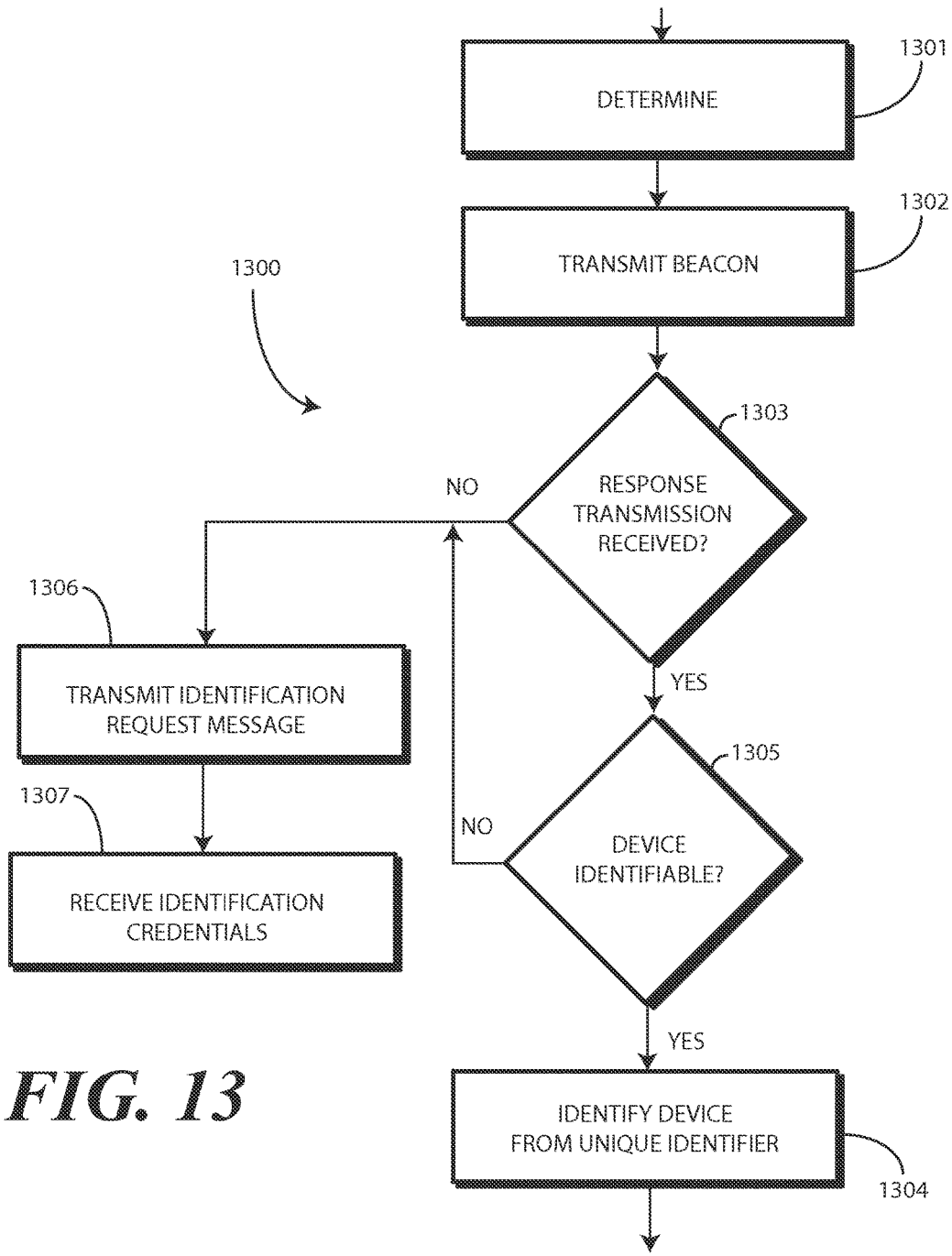
FIG. 13 illustrates one explanatory method in accordance with one or more embodiments of the disclosure.
Figure 14:
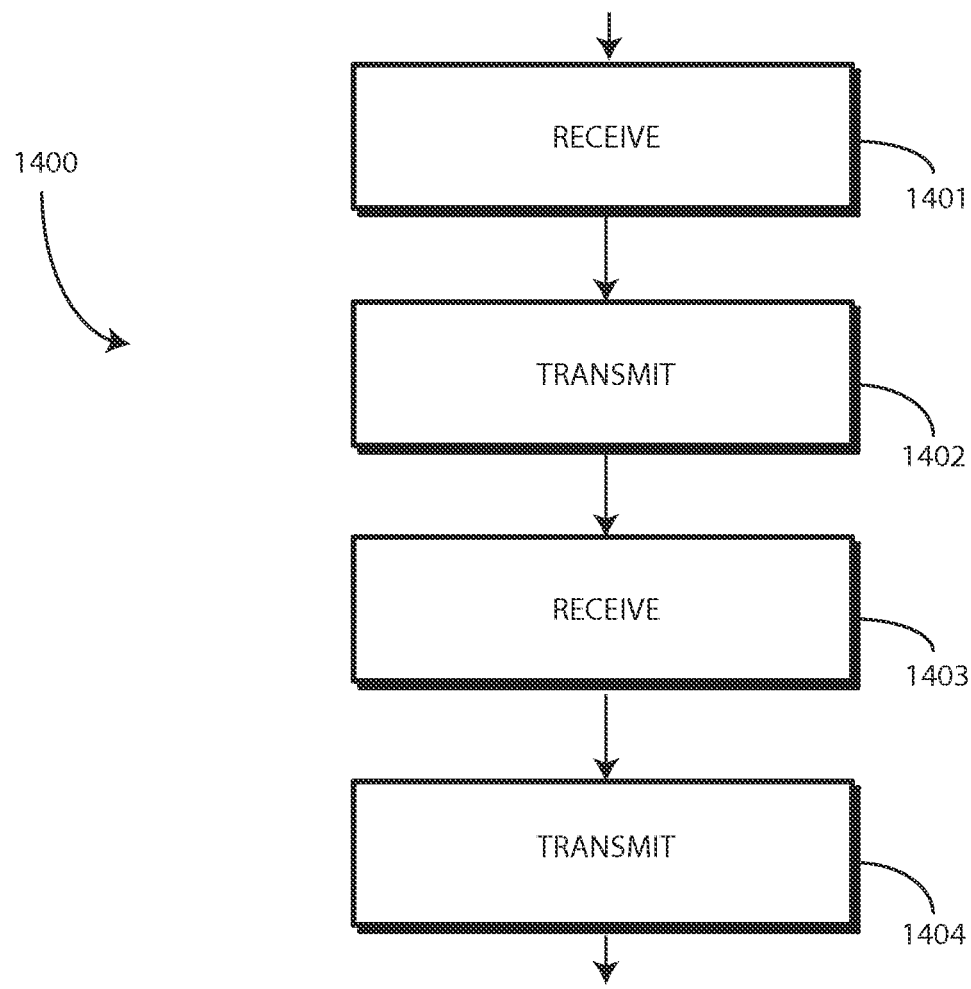
FIG. 14 illustrates another explanatory method in accordance with one or more embodiments of the disclosure.

Turning to FIG. 13, illustrated therein is one explanatory method 1300 in accordance with one or more embodiments of the disclosure. The method 1300 of FIG. 13 is for a device initiating a beacon signal. FIG. 14, discussed below, is a corresponding method for a device receiving a beacon.

At step 1301, the method 1300 includes determining, with at least one proximity sensor component comprising an infrared signal receiver to receive an infrared emission from an object external to a housing, that the object is within a thermal detection radius of the electronic device. At step 1302, the method 1300 includes causing a signal emitter of at least one proximity detector component comprising the signal emitter and a corresponding signal receiver to transmit a beacon having a unique identifier encoded therein. In one embodiment, step 1302 occurs in response to step 1301.

In one embodiment, step 1302 comprises multiplexing the beacon having the unique identifier encoded therein with one or more proximity detection beams. In one embodiment, this multiplexing can occur in accordance with a time-division multiplexing algorithm.

At decision 1303, the method 1300 can include receiving, in response to step 1302, a response transmission from another electronic device having another unique identifier encoded therein. At step 1304, the method 1300 can include identifying the other electronic device from the other unique identifier.

In one embodiment, as determined at optional decision 1305, the method 1300 can determine whether the other electronic device is identifiable. The other device may be unidentifiable for any number of reasons. For example, it may transmit an unidentified identifier encoded in its response transmission. Alternatively, it may not transmit a response transmission.

Regardless of cause, where the other device is unidentifiable, the method 1300 can include identifying the other electronic device from the other unique identifier at step 1304. However, where the other device is unidentifiable, in one embodiment, and in response to detecting the object within the thermal detection radius, the method 1300 can also include at step 1306, transmitting a request signal requesting identification credentials from another electronic device. Where this occurs, the method 1300 can optionally receive another response transmission from the other electronic device having at least some of the requested identification credentials encoded therein at step 1307.

Turning now to FIG. 14, illustrated therein is another method 1400 in accordance with one or more embodiments of the disclosure. At step 1401, the method 1400 includes receiving, from an electronic device a beacon having a unique identifier encoded therein. In one embodiment, the beacon is received at step 1401 with a signal receiver corresponding to a signal emitter of at least one proximity detector component.

At step 1402, and in response to the receiving at step 1401, the method can include transmitting, with the signal emitter, a response transmission having another unique identifier encoded therein. In one embodiment, the other unique identifier can comprises one of a pseudo-random code or an IMEI number.

At optional step 1403, the method 1400 can include receiving a request signal requesting identification credentials from another electronic device. Where this step 1403 occurs, the method 1400 can include sending a response transmission further having identification credentials therein.

As set forth herein, a method, apparatus, and system is provided for detecting one or multiple people within a thermal detection radius with a proximity sensor component. After the one or more people are detected, an electronic device can transmit a beacon. In one embodiment, this occurs in accordance serially in specific time slots so that gesturing detection is uninterrupted. Once presence is triggered, a signal transmitter and emitter are enabled and signal transmitter emits a beacon in a dedicated beacon time slot. The beacon can then hit the ceiling or any surface in its way, e.g., walls, glass, etc., and reflects down or back to other devices. These devices receive the beacon, which is specific to a sending device in accordance with a unique identifier, which can be a pseudo-random number with an IMEI used as a seed for generating the pseudo-random number. The number of response transmissions received indicates number and identity of devices in the room. Other sensors can be used to supplement this if needed, including intelligent imagers or microphones working with an identity module.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An electronic device, comprising:
   a housing;
   one or more processors;
   at least one proximity sensor component operable with the one or more processors and comprising an infrared signal receiver receiving an infrared emission from an object external to the housing without a corresponding transmitter; and
   at least one proximity detector component operable with the one or more processors and comprising a signal emitter and a corresponding signal receiver;
   the one or more processors actuating the at least one proximity detector component when the at least one proximity sensor component receives the infrared emission from the object, thereby causing the signal emitter to transmit a beacon having a unique identifier encoded therein; and
   the one or more processors monitoring the corresponding signal receiver for a response transmission from another electronic device in response to transmission of the beacon, and upon failing to receive the response transmission, causing the signal emitter to transmit a request signal requesting identification credentials from the another electronic device.

2. The electronic device of claim 1, the one or more processors receiving, with the corresponding signal receiver, and in response to transmission of the beacon, the response transmission from the another electronic device having another unique identifier encoded therein.

3. The electronic device of claim 2, the one or more processors identifying the another electronic device from the another unique identifier.

4. The electronic device of claim 3, further comprising a user interface, the one or more processors presenting indicia on the user interface comprising an identification of the another electronic device.

5. The electronic device of claim 1, the one or more processors actuating the one or more user interface devices when the at least one proximity sensor component receives the infrared emission from the object.

6. The electronic device of claim 1, the one or more processors, in response to transmitting the request signal, receiving another response transmission from the another electronic device having at least some of the identification credentials encoded therein.

7. The electronic of claim 1, the one or more processors performing a control operation when the at least one proximity sensor component receives the infrared emission from the object.

8. The electronic device of claim 7, the one or more processors, in response to transmitting the request signal, receiving another response transmission from the another electronic device having at least some of the identification credentials encoded therein.

9. The electronic device of claim 1, the one or more processors operable to cause the signal emitter to transmit the beacon in accordance with a time division-multiplexing algorithm along with one or more proximity detection beams.

10. The electronic device of claim 1, the unique identifier comprising a pseudo-random code.

11. The electronic device of claim 1, the unique identifier comprising an International Mobile Station Equipment Identity (IMEI) number.

12. A method, comprising:
    determining, with at least one proximity sensor component comprising an infrared signal receiver to receive an infrared emission from an object external to a housing, that the object is within a thermal detection radius of the electronic device; and
    in response to detecting the object within the thermal detection radius, causing a signal emitter of at least one proximity detector component comprising the signal emitter and a corresponding signal receiver to transmit a beacon having a unique identifier encoded therein;
    the transmitting comprising multiplexing the beacon having the unique identifier encoded therein with one or more proximity detection beams.

13. The method of claim 12, further comprising receiving, in response to the causing, a response transmission from another electronic device having another unique identifier encoded therein.

14. The method of claim 13, further comprising identifying the another electronic device from the another unique identifier.

15. The method of claim 13, the another unique identifier one of a pseudo-random code or an IMEI number.

16. The method of claim 13, the response transmission further having identification credentials therein.

17. The method of claim 12, further comprising, in response to detecting the object within the thermal detection radius, also transmitting a request signal requesting identification credentials from another electronic device.

18. The method of claim 12, further comprising actuating one or more user interface devices in response to the determining.

19. The method of claim 12, the multiplexing in accordance with a time-division multiplexing algorithm.

20. An electronic device, comprising:
a housing;
one or more processors;
at least one proximity sensor component operable with the one or more processors and comprising an infrared signal receiver receiving an infrared emission from an object external to the housing without a corresponding transmitter; and
at least one proximity detector component operable with the one or more processors and comprising a signal emitter and a corresponding signal receiver;

the one or more processors actuating the at least one proximity detector component when the at least one proximity sensor component receives the infrared emission from the object, thereby causing the signal emitter to transmit a beacon having a unique identifier encoded therein;

the one or more processors, upon failing to identify the another electronic device from the another unique identifier, causing the signal emitter to transmit a request signal requesting identification credentials from the another electronic device; and the one or more processors, in response to transmitting the request signal, receiving another response transmission from the another electronic device having at least some of the identification credentials encoded therein.

\* \* \* \* \*